United States Patent
Leggett

[11] Patent Number: 5,158,337
[45] Date of Patent: Oct. 27, 1992

[54] SEATS FOR CHILDREN

[75] Inventor: Basil Leggett, London, England

[73] Assignee: Aviation Furnishings International Limited, Redhill, England

[21] Appl. No.: 614,848

[22] Filed: Nov. 14, 1990

[30] Foreign Application Priority Data

Aug. 21, 1990 [GB] United Kingdom ............... 9018322

[51] Int. Cl.$^5$ ............................................. B60N 2/26
[52] U.S. Cl. ..................................... 297/250; 297/354
[58] Field of Search ............... 297/250, 256, 382, 17, 297/485, 354

[56] References Cited

U.S. PATENT DOCUMENTS

| | | | |
|---|---|---|---|
| 2,577,949 | 12/1951 | Barrett | 297/382 |
| 3,054,637 | 9/1962 | Pambello | 297/256 X |
| 3,092,224 | 6/1963 | O'Neil | 297/17 X |
| 4,402,548 | 9/1983 | Mason | 297/484 X |
| 4,521,052 | 6/1985 | Cone | 297/250 X |

FOREIGN PATENT DOCUMENTS 2154131 9/1985 United Kingdom ............... 297/250

Primary Examiner—Peter R. Brown
Attorney, Agent, or Firm—Kinney & Lange

[57] ABSTRACT

A seat for a child arranged to be disposed upon a full size seat in a vehicle, comprising a base platform and a back platform, the base platform and the back platform being demountable from their normal seat-like disposition and being capable of storing in a flat or generally flat disposition. The child seat may be a foldable seat, or may have a back platform separable from the base platform when not in use.

3 Claims, 3 Drawing Sheets

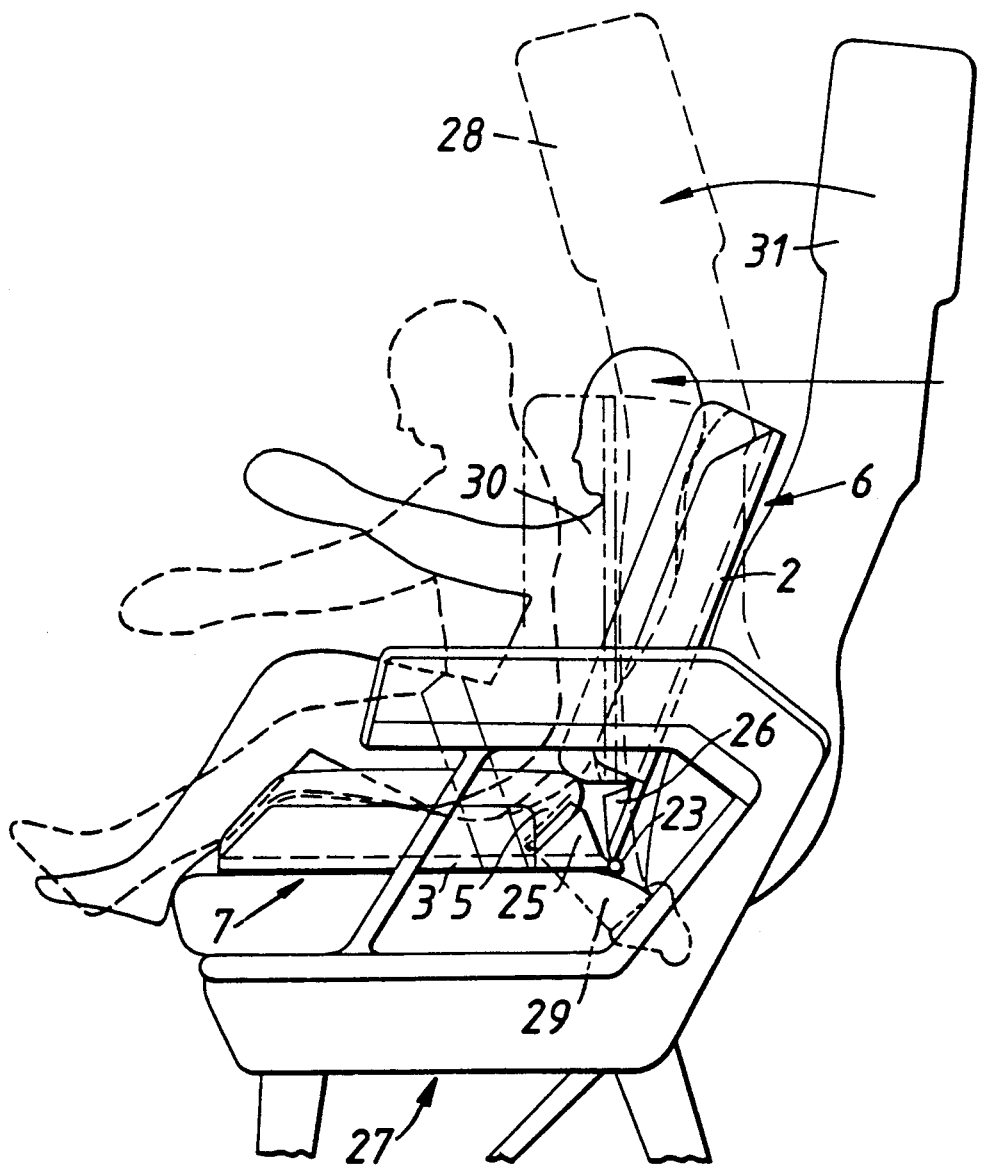

SEATS FOR CHILDREN

FIELD OF THE INVENTION

This invention relates to seats for children, and more particularly relates to seats suitable for children which expression used herein includes seats for persons of small or child-like dimensions, and all of which seats are adapted for mounting upon full sized seats in vehicles.

The invention relates especially, although not exclusively to such seats for children arranged for mounting upon seats for adults in aircraft.

It is to be understood that the expression "aircraft" herein used included airships, conventional fixed wing aircraft, helicopters, autogyros, and any other man carrying vehicle used for travelling through the air, including space vehicles and re-entry vehicles from space, or hovercraft and surface effect vehicles. Additionally, the invention is applicable to car, train and similar vehicles normally fitted with adult sized seats.

Civil Aviation recommendations call for the use of appropriately sized seats for children of a size not enabling them to be adequately protected in civil aviation aircraft in standard adult sized seats. Such requirements essentially cover children up to the age of approximately 3 or 4 years.

DESCRIPTION OF PRIOR ART

Conventional child seats, developed, for example, for use in automobiles comprise non-folding upholstered plastics or glass reinforced plastics or metal formed shells having appropriate restraint harness and attachments to the host adult seat. However, the considerable three-dimensional bulk of such seats severely limits the quantity which can be carried for on-board stowage on aircraft and necessitates a substantial plurality of seats being located at a plurality of airports for use as and when required, at considerable inconvenience and expense.

SUMMARY OF THE INVENTION

It is an object of the present invention to overcome or at least significantly reduce this problem.

In accordance with one aspect of the present invention, there is provided a seat for a child arranged to be disposed upon a full size seat in a vehicle, comprising a base platform and a back platform, the base platform and the back platform being demountable from their normal seat-like disposition and being capable of storing in a flat or generally flat disposition.

The base platform and the back platform may be capable of storing in a generally flat disposition together.

The child seat may be a foldable seat, and/or may have a back platform separable from the base platform when not in use.

In accordance with another aspect of the present invention there is provided a child seat arranged to be disposed upon a host full size seat in a vehicle, comprising a base platform and a back platform, the base platform and the back platform being hingedly connected together such that when not disposed upon the host full size seat, the child seat may be folded to a configuration at which the rear surface of the back platform adjoins the undersurface of the base platform.

In a preferred embodiment of the invention, the child seat is provided with restraints associated with the base platform and the back platform such that, in its disposition appropriate for location upon the host adult seat, the back platform is capable of folding forward to a limited extent until the restraints on the back and base portion engage preventing further forward folding. Such an arrangement enables the child seat to conform to the mandatory "break forward" function of the back of the host seat for the protection of the passenger behind in the event of violent deceleration of the aircraft, and/or if a load is applied to the backrest of the host seat during a panic evacuation of the aircraft, for example. In the former case such a passenger would otherwise suffer a potentially hazardous "head strike" situation if the back of the host seat were obstructed by the installed child seat without the facility for such limited forward folding.

The child seat is desirably provided with its own harness for the child, which may conveniently comprise a lap belt, together with a double shoulder restraint arrangement, so that in the event of violent decelleration, subsequent to the limited fold forward movement of the backrest of the child seat, a child located therein is protected and restrained by the harness in association with the restrained back platform.

In a preferred arrangement of the invention, the child seat is adapted for attachment to a host adult seat in a civil aircraft by means of the normal lap strap associated with the host seat fastening across the seat base platform of the child seat, or its junction with the back platform thereof, preferably beneath upholstery of the seat squab of the child seat, which, in one embodiment, is capable of temporary lifting for access whilst installing the lap strap from the adult seat.

By means of backwards folding arrangement of the child seat of the present invention, the child seat may, when not in use, be located in its folded away condition in an appropriate bag, which in aircraft usage may conveniently be disposed in an overhead luggage compartment.

DESCRIPTION OF THE DRAWINGS

In order that the invention may be more readily understood, one embodiment thereof will now be described by way of example with reference to the accompanying drawings in which:

FIG. 3 is a schematic side elevation showing the disposition and action of the child seat of FIGS. 1 and 2 when disposed on an adult Civil Aviation aircraft seat.

DETAILED DESCRIPTION OF THE PREFERRED EMBODIMENT

Figure 1:
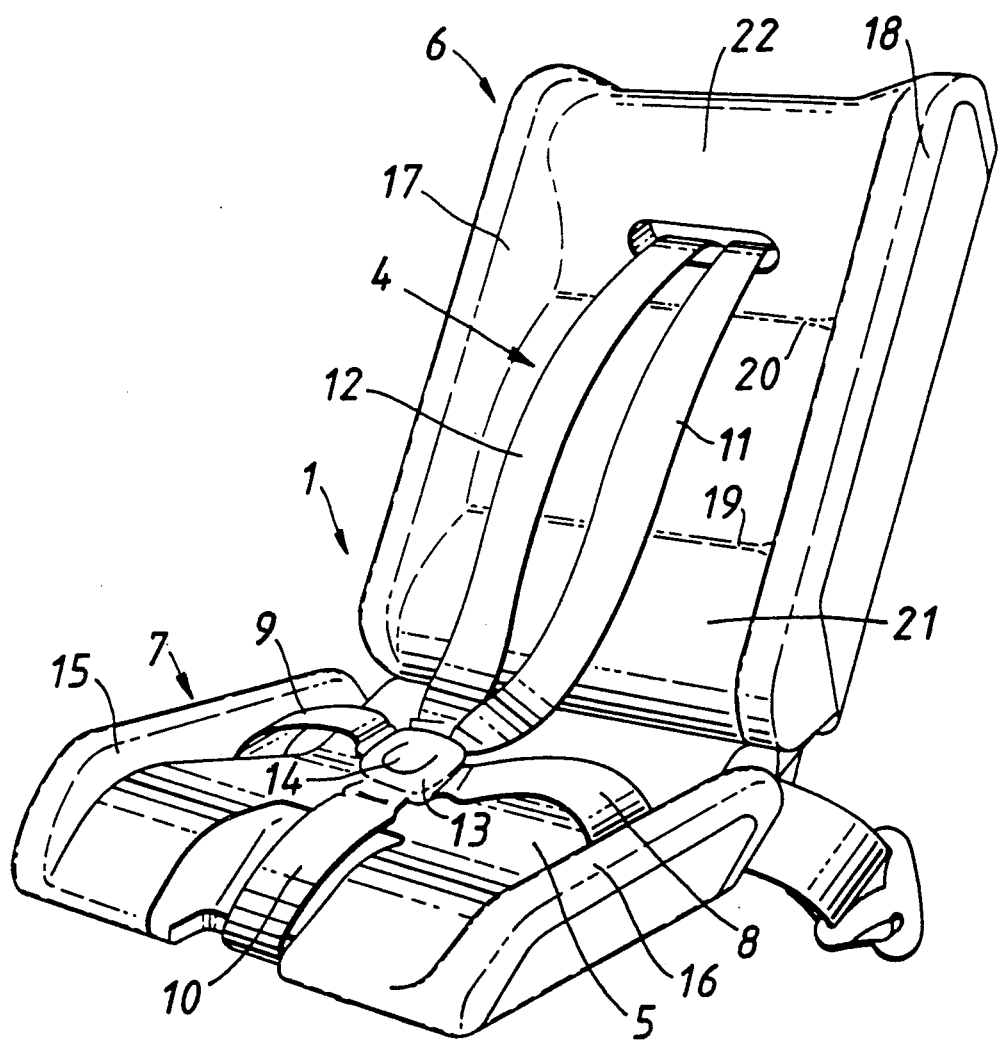
FIG. 1 is an isometric view of a child seat in accordance with the invention.

The example of the child seat of the invention illustrated has been designed on the basis of usage by a small child of up to 2 years, or a larger child of up to 2½ years of age, providing safe restraint under appropriated Civil Aviation Authority regulations for fixed wing aircraft which, because of the severity of such requirements, provides cover for other vehicle parameters within the term aircraft as hereinbefore defined.

As can be seen from the Figures, the child seat 1 essentially comprises a back platform 2 and a base platform 3 comprising, with its cushions 4,5, a backrest or squab 6, and a seat squab 7.

The child seat is provided with a full restraining harness comprising lap belts 8, 9, a between leg belt or crotch strap 10, and two opposite over-shoulder belts 11,12, meeting in a latch 13 of common aircraft pilot design (but miniaturised) for instant release by rotation or depression of a central button 14.

The seat squab 7 is provided with side restraint portions 15,16, and the seat cushioning 5 is shaped to tend to cause the child to seat well back in the seat squab.

The back squab is similarly provided with side restraints 17,18 to prevent sideways movement, and its cushioning 4 is provided with double indents 19,20, so that a small child will be located with his head located at the upper indent 20, his back being firmly supported by the lumbar support 21 below the first indent, whilst a larger child will, having the same spinal support 21 at the base of his back, find his head located upon the upper forwardly protruderant part 22 of the cushioning of the back squab.

Figure 2:
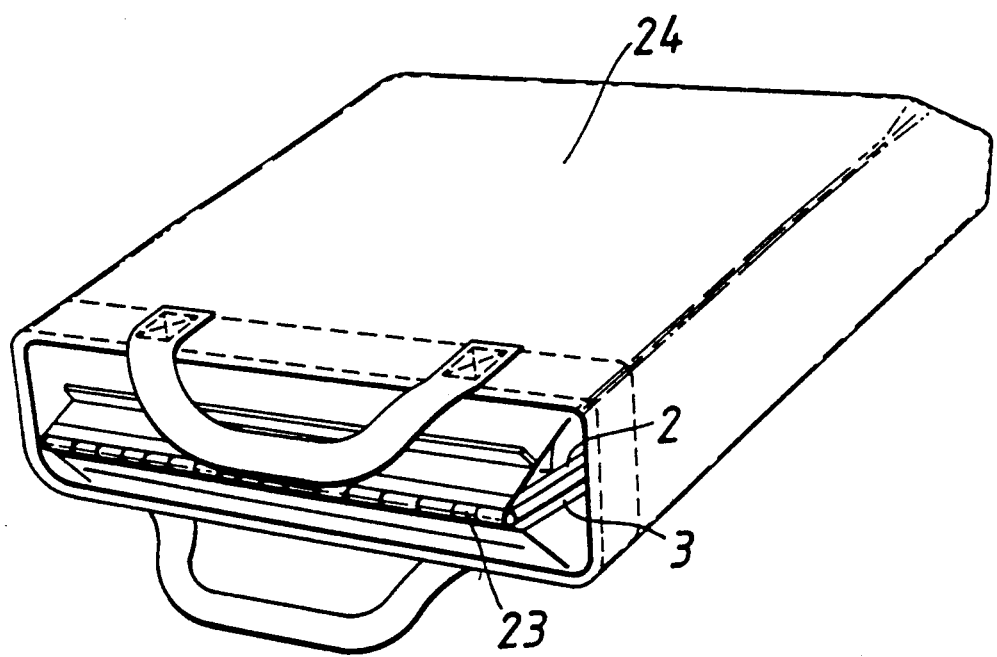
FIG. 2 is an isometric view of the child seat of FIG. 1 in its folded away condition located in the stowage bag.

As can be seen from FIG. 2, the child seat 1 is capable of folding about a hinge 23 joining the base platform 3 and the back platform 2 with the rear of the back platform 2 lying alongside the underside of the base platform 3, and in this condition the seat is capable of being stowed into a purpose designed stowage bag 24 of compact size which may, for example with one embodiment of a child seat of satisfactorily usable dimensions, be no more than 17"×13"×9" in dimensions.

As can be seen particularly clearly in FIG. 3, the back platform 2 and base platform 3 are provided with solid restraint stops of stainless steel sheet and aluminium alloy strip respectively 26 and 25. The restraint stops enable the back platform 2 to move forward under deceleration forces, or under pressure from the backrest 31 of the host seat 27 by an angle of approximately 22.5°. This enables the mandatory break forward function of the backrest of the host adult seat in the event of aircraft crash deceleration to the position shown at 28.

It will be observed that the child seat is adequately restrained by means of the normal lap strap 29 of the host seat 27 fastened across the base platform 3 of the child seat, over the base restraint stop 25, but beneath the cushioning 5 of the child seat which may be lifted for access and fastening of the lap strap 29 of the host seat.

Construction of the child seat may, for example be of aluminium alloy plate. The cushioning foam and cloth covering may be arranged to meet the fire-retardancy requirements of C.A.A. Airworthiness Notice No. 59.

Restraint harness 8,9,10,11,12 fitted to the child seat may be 1" wide approved webbing similar to the 2" wide webbing used for the lap strap 29 of the host seat.

The main hinge 23 of the child seat between the back platform 2 and seat platform 3 may be of an approved aluminium extruded type recommended for aviation use. The restraint stops 25,26 may be of a stainless steel sheet.

It is to be understood that the foregoing is merely exemplary of child seats in accordance with the invention and that modifications can readily be made thereto without departing from the true scope of the invention.

I claim:

1. A seat for a child arranged to be disposed upon a host full size seat in a vehicle comprising a base platform and a back platform, said back platform having a rear surface and said base platform having an undersurface, the base platform and the back platform being hingedly connected together at a junction therebetween such that when not disposed upon said host full size seat the seat may be folded to a configuration at which the rear surface of the back platform adjoins the undersurface of the base platform, said seat having restraint means associated with the said base platform and said back platform for allowing said back platform to fold forward to a limited extent and preventing further folding forward beyond said limited extent; said seat having its own harness for a child; a platform of the seat comprising means for receiving a normal lap strap of a host adult seat in a civil aircraft to attach the seat to a host adult seat in a civil aircraft including upholstery fixedly mounted thereon that, at an edge portion, extends over the platform in an unattached manner such that the upholstery is capable of being temporarily lifted therefrom for access whilst installing the lap strap seat beneath the upholstery in the region of said junction.

2. A seat for a child as claimed in claim 1 wherein the harness comprises a lap belt, together with a double shoulder restraint arrangement.

3. A seat for a child arranged to be disposed upon a host full size seat in a vehicle, comprising a base platform and a back platform, the base platform and the back platform being hingedly connected together, said seat having restraint means associated with said base platform and said back platform for allowing said back platform to fold forward to a limited extent and prevent further folding forward beyond said limited extent; said seat further having its own harness for a child; the base platform of the seat having means for receiving a normal lap strap of a host adult seat in a civil aircraft to attach the seat to a host adult seat in a civil aircraft; and wherein the base platform has upholstery fixedly mounted thereon that, at it's rearmost edge portion, extends over the base platform in a unattached manner, such that the upholstery is capable of temporarily lifting away from the base platform for access whilst installing the lap strap across the base platform.

* * * * *